US012535335B2

(12) United States Patent
Rech et al.

(10) Patent No.: US 12,535,335 B2
(45) Date of Patent: Jan. 27, 2026

(54) METHOD AND COMMUNICATION SYSTEM FOR SUPPORTING AT LEAST PARTIALLY AUTOMATIC VEHICLE CONTROL

(71) Applicants: Volkswagen Aktiengesellschaft, Wolfsburg (DE); MAN Truck & Bus SE, Munich (DE)

(72) Inventors: Bernd Rech, Bokensdorf (DE); Constanze Hungar, Braunschweig (DE); Daniel Wilbers, Wolfsburg (DE); Niklas Koch, Wolfsburg (DE); Stefan Jürgens, Braunschweig (DE); Christian Merfels, Braunschweig (DE)

(73) Assignees: VOLKSWAGEN AKTIENGESELLSCHAFT, Wolfsburg (DE); MAN TRUCK & BUS SE, Munich (DE)

( * ) Notice: Subject to any disclaimer, the term of this patent is extended or adjusted under 35 U.S.C. 154(b) by 42 days.

(21) Appl. No.: 17/625,280
(22) PCT Filed: Jul. 14, 2020
(86) PCT No.: PCT/EP2020/069869
§ 371 (c)(1),
(2) Date: Jan. 6, 2022
(87) PCT Pub. No.: WO2021/009165
PCT Pub. Date: Jan. 21, 2021

(65) Prior Publication Data
US 2022/0316909 A1 Oct. 6, 2022

(30) Foreign Application Priority Data
Jul. 15, 2019 (DE) ...................... 10 2019 119 095.9

(51) Int. Cl.
*G01C 21/00* (2006.01)
*B60W 50/02* (2012.01)
(Continued)

(52) U.S. Cl.
CPC ......... *G01C 21/3811* (2020.08); *B60W 50/02* (2013.01); *G01C 21/30* (2013.01);
(Continued)

(58) Field of Classification Search
CPC .... G01C 21/3811; G01C 21/30; B60W 50/02; B60W 2554/20; B60W 2554/802; B60W 2556/40; B60W 2556/45; H04L 67/12
See application file for complete search history.

(56) References Cited

U.S. PATENT DOCUMENTS

2012/0271540 A1\* 10/2012 Miksa ................. G08G 1/167
701/409
2017/0261995 A1\* 9/2017 Heimberger ......... G05D 1/0088
(Continued)

FOREIGN PATENT DOCUMENTS

DE 102012224110 A1 6/2014 ............ B60W 30/08
DE 102014111126 A1 2/2016 ............ B60W 30/06
(Continued)

OTHER PUBLICATIONS

International Search Report and Written Opinion, Application No. PCT/EP2020/069869, 8 pages.
(Continued)

*Primary Examiner* — David P. Merlino
*Assistant Examiner* — Mahmoud M Kazimi
(74) *Attorney, Agent, or Firm* — Slayden Grubert Beard PLLC (57) ABSTRACT

A method for providing an information signal (8) for at least partially automatic vehicle control involves an environment sensor system (3) of a motor vehicle (1) being used to generate measurement data for surroundings of the motor vehicle (1). A computing unit (2) of the motor vehicle (1) is used to identify an object (7) and a landmark (5) on the basis of the measurement data. The computing unit (4) is used to determine a first relative position of the object (7) in relation to the landmark (5) on the basis of the measurement data. A
(Continued)

communication interface (4) of the motor vehicle (1) is used to generate the information signal (8) on the basis of the first relative position.

16 Claims, 3 Drawing Sheets

(51) Int. Cl.
*G01C 21/30* (2006.01)
*H04L 67/12* (2022.01)

(52) U.S. Cl.
CPC ......... *H04L 67/12* (2013.01); *B60W 2554/20* (2020.02); *B60W 2554/802* (2020.02); *B60W 2556/40* (2020.02); *B60W 2556/45* (2020.02)

(56) References Cited

U.S. PATENT DOCUMENTS

| | | | |
|---|---|---|---|
| 2017/0314956 A1* | 11/2017 | Shiina | G01C 21/3679 |
| 2018/0364720 A1 | 12/2018 | Alawieh et al. | |
| 2019/0128678 A1 | 5/2019 | Merfels et al. | |
| 2019/0383631 A1* | 12/2019 | Bigio | G06V 20/59 |

FOREIGN PATENT DOCUMENTS

| | | | | |
|---|---|---|---|---|
| DE | 102014217847 A1 | | 3/2016 | ............. G01C 21/28 |
| DE | 102016205964 A1 | | 10/2017 | .............. G01S 5/00 |
| DE | 102016211625 A1 | | 12/2017 | ............. G08G 1/127 |
| DE | 102016214470 A1 | * | 2/2018 | ............ G01C 21/005 |
| DE | 102017210070 A1 | | 12/2018 | ............... G08G 1/00 |
| DE | 102018008904 A1 | * | 5/2019 | |
| EP | 3232159 A1 | | 10/2017 | ............. G01C 21/30 |
| EP | 3926304 A1 | | 12/2021 | ............. G01C 21/00 |
| WO | 2021/009165 A1 | | 1/2021 | ............. G01C 21/00 |

OTHER PUBLICATIONS

European Office Action, Application No. 20740313.0, 5 pages.
European Notice of Allowance, Application No. 20740313.0, 9 pages.

* cited by examiner

METHOD AND COMMUNICATION SYSTEM FOR SUPPORTING AT LEAST PARTIALLY AUTOMATIC VEHICLE CONTROL

CROSS-REFERENCE TO RELATED APPLICATIONS

This application claims priority to German Patent Application No. DE 10 2019 119 095.9, filed on Jul. 15, 2019 with the German Patent and Trademark Office. The contents of the aforesaid Patent Application are incorporated herein for all purposes.

TECHNICAL FIELD

The present invention relates to a method for providing an information signal for at least partially automatic vehicle control, wherein measurement data of surroundings of a motor vehicle is generated by means of an environment sensor system of the motor vehicle. Further, the invention relates to a method for at least partially automatic vehicle control, to a communication system as well as to a computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Automatic or partially automatic driving is usually dependent on current high-definition map material, called HD maps. Dependent on concept, however, these maps become outdated when situations in the surroundings change.

In addition, information exchange between various motor vehicles is limited in that they partially use different map systems, for example maps of different manufacturers, and errors accordingly result upon the local association of the transmitted information.

SUMMARY

A need exists to provide improved at least partially automatic vehicle control, by which errors due to different map materials are reduced.

The need is addressed by the respective subject matter of the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Teachings herein are based on the idea to determine a relative position of an object in relation to a landmark from the measurement data of a motor vehicle and to provide an information signal depending on the relative position.

According to a first independent and exemplary aspect, a method for providing an information signal for at least partially automatic vehicle control is specified. Therein, measurement data of surroundings of a motor vehicle is generated by means of an environment sensor system of the motor vehicle. By means of a computing unit of the motor vehicle, an object and a landmark in the surroundings are identified based on the measurement data. By means of the computing unit, a first relative position of the object in relation to the landmark, in particular in relation to a position of the landmark, in particular in relation to a position of a point of the landmark, is determined based on the measurement data. By means of a communication interface of the motor vehicle, the information signal is generated depending on the first relative position to thereby provide the information signal.

The environment sensor system is a sensor system with one or multiple sensors, by which the surroundings or characteristics of the surroundings may be imaged or represented. Thereto, the environment sensor system may for example include a radar system, an optical sensor system, for example a passive optical sensor system, in particular a camera, or an active optical sensor system, for example a laser scanner or a lidar system. The imaging of the surroundings or of the characteristics of the surroundings is in particular effected in the form of one or multiple camera images and/or one or multiple point clouds of sample points. Therein, a point cloud may be understood as a set of three-dimensional coordinate tuples of corresponding sample points of the surroundings. For example, point clouds are generated by means of a radar system or an active optical sensor system.

In particular, the measurement data may include data, which has been captured at different points of time. For example, the measurement data may include point clouds and/or camera images captured at different points of time.

For example, the surroundings of the motor vehicle may include parts of a roadway, on which the motor vehicle is located, as well as further static and/or dynamic objects, which are located in one or multiple fields of view, FOV, of the environment sensor system.

Here, and in the following, a feature in the surroundings may in particular be understood as a landmark, which has characteristic, measurable, stationary and temporally invariable characteristics or a pool of such features or an item with one or multiple such features.

For example, signs, traffic signs, pillars, posts, masts, poles, roadway markings, roadway boundaries, buildings and so on are possible as landmarks.

The object may be a static or a dynamic object in the surroundings. However, the object is in particular not a landmark.

The first relative position is in particular coordinates of a first point of the object in relation to a point of the landmark, thus in particular in a coordinate system defined by the point of the landmark, in which the point of the landmark thus sets the coordinate origin or is located in the coordinate origin. Thus, the first relative position may be understood as a position vector of the first point in the coordinate system of the landmark or as a connection vector from the point of the landmark to the first point of the object.

The first point of the object is in particular a point on the object or a point on a geometric figure, which at least approximately describes the object.

The position of the point of the landmark may for example be determined from the measurement data or be preset in relation to a reference coordinate system, in particular be stored, for example on the computing unit or a storage unit of the computing unit or of the motor vehicle.

In particular, the motor vehicle may comprise a map, in particular digital map. The map comprises a map coordinate system, which may for example serve as the reference coordinate system. Therein, the map may be understood as a database, in which a plurality of position data is stored, in particular coordinates corresponding to the positions in the map coordinate system. For example, coordinates of the point of the landmark may be stored in the map. The information signal may for example be or include a V2V or V2X message or be a part of such a message. Therein, V2V stands for vehicle-to-vehicle and V2X stands for vehicle-to-infrastructure or vehicle-to-X.

The information signal is in particular an electromagnetic signal.

For example, the information signal contains information about the existence of the object and the first relative position as the information. Optionally, the information signal may include coordinates of the first point of the object in the map coordinate system and/or the coordinates of the landmark in the map coordinate system. Optionally, the information signal may include one or multiple corresponding characteristic values for an accuracy of the coordinates or the first relative position.

The information, which is provided by means of the information signal, may be used for at least partially automatic vehicle control of a further motor vehicle.

According to the teachings herein, the position of the landmark is assumed as fixedly preset and invariable and effectively serves as a reference for the position of the object in that the first relative position is indicated in relation to the landmark. This has the benefit that the position of the landmark may be independently determined by the further motor vehicle itself, for example by own measurements or images of the surroundings or by reading out a corresponding further map of the further motor vehicle. In that the information signal provides the position of the object as the first relative position in relation to the landmark, errors, which arise due to deviations of the map from the further map, are avoided. The further motor vehicle may beneficially use the information signal and therefore the first relative position of the object even if itself cannot, cannot yet capture the object or cannot capture the object with sufficient accuracy or may only incompletely capture the object, for example because it is still too far away from the object.

The teachings herein are not dependent on the determination of the position of the motor vehicle based on satellite data. Since corresponding positioning systems based on satellites are regularly comparatively imprecise or else very cost-intensive, this results in corresponding benefits.

For identifying the landmark, the computing unit for example recognizes that one or multiple potential landmarks are possibly located in the surroundings, based on the measurement data. The measurement data is correspondingly compared to information stored on the map to determine if one of the potential landmarks is actually a landmark. Thereby, the position of the motor vehicle may be determined based on the positions of the landmark stored in the map and the measurement data. In addition, it may be determined by means of the computing unit if a deviation of the measured position of the landmark from an expected position of the landmark or a position stored in the map exists. If a significant deviation is identified, this landmark is not used for generating the information signal.

The described steps of the method for providing the information signal according to the teachings herein may for example be repeated for multiple landmarks in the surroundings. In particular, a first relative position of the object may then be determined in relation to multiple or all of the identified landmarks in the surroundings and the information signal may be generated based on the corresponding first positions of the object. Thereby, higher reliability of and better verifiability of and/or capability of making plausible, respectively, the information signal for vehicle control may be allowed.

In some embodiments, the measurement data includes at least two subsets of measurement data. The at least two subsets of measurement data each correspond to measurement data, which has been captured at different points of time or during different periods of time by means of the environment sensor system and accordingly corresponds to in particular different relative positions of the motor vehicle and of the environment sensor system, respectively, in relation to the object.

The described steps of the method, in particular identifying the object and the landmark and determining the first relative position, are performed for each subset. The information signal is then generated based on the corresponding first relative positions, which have been generated based on the individual subsets. Due to the different perspectives, from which the environment sensor system captures the object and the landmark, an increased accuracy is achieved.

In some embodiments, a comparison is performed based on map data of the map of the motor vehicle and based on the measurement data by means of the computing unit and the object is identified based on a result of the comparison by means of the computing unit to identify the object based on the measurement data.

The map is in particular a digital map, thus a database, on which the map data and optionally further map data is stored. The map may in particular be designated as HD map ("high definition"). Therein, the designation HD map expresses that the map data is stored on the map with a spatial resolution in the range of one or several centimeters. The map may for example be stored on the computing unit or on a storage unit of the motor vehicle or of the computing unit.

In particular, the map data includes corresponding coordinates of the object and optionally of further objects as well as of the landmarks in the map coordinate system.

In order to perform the comparison, the measurement data or data depending on the measurement data is in particular compared to the map data or to data depending on the map data by means of the computing unit.

For example, desired data may be derived from the map data and it may be compared to the measurement data. Alternatively or additionally, data derived from the measurement data may be compared to the map data.

If the result of the comparison includes the information that a significant deviation of the measurement data from data expected according to the map data is not present, thus, the object was not identified. In contrast, if a corresponding significant deviation is present, thus, the object was identified. What may be considered as significant, may for example be defined in the form of one or multiple tolerance ranges.

Since the map data cannot be updated with high frequency due to the large amount of data, which the map stores, by means of the teachings herein, a corresponding deviation may be quantified in the form of the first relative position and be provided in the form of the information signal for example to further motor vehicles and/or to a backend server or another stationary computer system to allow an at least partially automatic vehicle control of the further motor vehicle.

In some embodiments, coordinates of the object, in particular of the first point of the object, are determined in a preset sensor coordinate system, in particular of the environment sensor system, depending on the measurement data. Coordinates of the landmark, in particular of the point of the landmark, are determined in the sensor coordinate system depending on the measurement data by means of the computing unit. The first relative position is determined depending on the coordinates of the object in the sensor coordinate system and depending on the coordinates of the landmark in the sensor coordinate system by means of the computing unit.

The sensor coordinate system is in particular a coordinate system rigidly connected to the environment sensor system, in other words a sensor-fixed coordinate system. For example, axes of the sensor coordinate system may be defined by an optical axis of the environment sensor system and axes perpendicular thereto. By the rigid connection of the sensor coordinate system to the environment sensor system, the sensor coordinate system is in particular also rigidly connected to the motor vehicle.

The coordinates of the object and of the landmark, respectively, may also be understood as respective position vectors in the sensor coordinate system.

The first relative position of the object may for example be calculated as a difference of the position vector of the first point of the object in the sensor coordinate system and of the position vector of the landmark or of the point of the landmark in the sensor coordinate system.

Depending on the type of the measurement data and of the environment sensor system, it may increase the accuracy of the relative position to calculate it directly in the sensor coordinates.

In some embodiments, coordinates of the object are determined in the map coordinate system of the motor vehicle depending on the measurement data by means of the computing unit. Coordinates of the environment sensor system are determined in the map coordinate system depending on the measurement data. The first relative position is determined depending on the coordinates of the object in the map coordinate system and depending on the coordinates of the environment sensor system in the map coordinate system by means of the computing unit.

In particular, the coordinates of the object are determined in the map coordinate system depending on the measurement data and the map data. In particular, the coordinates of the object are determined in the map coordinate system depending on the coordinates of the landmark in the map coordinate system, on the coordinates of the object in the sensor coordinate system and on the coordinates of the environment sensor system in the map coordinate system. For example, the position vector of the first point of the object in the map coordinate system $O_K$ may be given as $O_K = L_K - L_S + O_S$, wherein $L_K$ denotes the position vector of the point of the landmark in the map coordinate system, $L_S$ denotes the position vector of the landmark in the sensor coordinate system and $O_S$ denotes the position vector of the point of the object in the sensor coordinate system.

The coordinates of the environment sensor system in the map coordinate system are in particular determined depending on the measurement data and the map data. In particular, the coordinates of the environment sensor system in the map coordinate system are determined depending on the coordinates of the landmark in the map coordinate system and the landmark in the sensor coordinate system. For example, the position vector of the environment sensor system in the map coordinate system $S_K$ is given by $S_K = L_K - L_S$.

Depending on the type of the raw data and of the environment sensor system, the apparent detour of the calculation of the first relative position via the measurement data and the map data may be more accurate.

The connection vector $V$ of the point of the landmark to the first point of the object is in particular given by $V = O_K - S_K - L_S$.

In some embodiments, a geometric figure for approximate description of the object is determined based on the measurement data, and a relative position of a first point of the geometric figure in relation to the landmark is determined as the relative position of the object by means of the computing unit.

In other words, the first point of the object is the first point of the geometric figure in such embodiments.

The first point of the geometric figure may be located on the object or approximately on the object.

The geometric figure may be a curve in a plane, thus a plane curve, which extends around the object and/or extends around a projection of the object into the plane and encloses the projection. The plane may for example be a plane parallel to a ground of the motor vehicle, for example parallel to a roadway.

The plane curve may for example be a polygon, a rectangle, a circle, an ellipse, an oval or a curve described by one or multiple polynomials.

The plane curve may in particular be an envelope of the projection of the object into the plane.

The geometric figure may also be a spatial, thus three-dimensional, curve, which extends around the object.

The geometric figure may also be a three-dimensional body, which encloses the object, for example a bounding box.

The geometric figure may be understood as an approximation of the object. Instead of directly processing raw data, thus the measurement data, which more or less exactly represents the object, a corresponding computational effort may be reduced by approximation of the object by means of the geometric figure.

In particular, the geometric figure may be defined by a relatively low number of points.

The geometric figure in particular comprises at least two points, which may be regarded as supporting points and include the first point of the geometric figure. Typically, the geometric figure may include a number of points or supporting points in the order of magnitude of several or several tens of points.

Determining the geometric figure in particular includes calculating coordinates of the at least two points, for example in the sensor coordinate system, which may for example be corner points of the figure or other supporting points of the figure.

By the calculation of the points of the geometric figure, the extension of the object may in particular be estimated without having to transmit an exact representation of the object by means of the information signal.

In some embodiments, a second relative position of the object is determined based on the measurement data by means of the computing unit. By means of the communication interface, the information signal is generated depending on the first and the second relative position of the object.

The second relative position is in particular a relative position of the object in relation to the landmark or in relation to the first point of the object.

In some embodiments, the second relative position is a relative position of a second point of the object, thus, it is coordinates of the second point of the object in relation to the point of the landmark or in relation to the first point of the object.

In some embodiments, the second point of the object is a second point of the geometric figure.

By providing the first and the second relative position in the form of the information signal, more information is provided. Thereby, more diverse possibilities of at least partially automatic vehicle control based on the information signal arise. Higher reliability, better verifiability and capability of making plausible are achieved.

In some embodiments, a class of at least two preset classes is associated with the object based on the measurement data by means of the computing unit. By means of the communication interface, the information signal is generated depending on the class associated with the object.

In order to associate the class with the object, the computing unit may in particular perform image analysis, for example by means of a classifier software module or an artificial neural network.

Associating the class with the object may for example be understood as associating semantic information with the object. For example, the semantic information may relate to the type or size or other characteristics of the object.

In particular, the object may be a static or a dynamic object. The object may for example be a construction site, another vehicle, for example a truck, in particular a stationary vehicle, a roadway marking, a roadway boundary, a building or the like.

By considering the semantic information in the information signal, more diverse possibilities of controlling the further motor vehicle are allowed. Higher reliability, better verifiability and capability of making plausible are achieved.

In some embodiments, the information signal is, in particular directly, transmitted to the further motor vehicle by means of the communication interface.

In particular, the information signal is transmitted to a further communication interface of the further motor vehicle by means of the communication interface and the information signal is received by the further communication interface.

In particular, the transmission is effected in the form of electromagnetic signals, in particular as V2V or V2X message.

The transmitted information signal may be used by the further motor vehicle for at least partially automatic control of the further motor vehicle.

In some embodiments, the information signal is transmitted to a server computer system, in particular a communication interface of the server computer system, by means of the communication interface and a further information signal is generated depending on the information signal and transmitted to the further motor vehicle, in particular the further communication interface of the further motor vehicle, by means of the server computer system.

The further motor vehicle, which receives the further information signal, may in particular be the same further motor vehicle, which receives the information signal, or another motor vehicle.

In such embodiments, the further motor vehicle may use the further information signal for at least partially automatic control of the further motor vehicle.

In particular, a content of the further information signal may be equal to a content of the information signal.

By transmitting the information signal to the server computer system and forwarding the corresponding information by the server computer system to the further motor vehicle by means of the further information signal, the corresponding information may also be provided outside of a transmission range of the motor vehicle and independently of time, respectively.

In some embodiments, further measurement data of further surroundings of the further motor vehicle is generated by means of a further environment sensor system of the further motor vehicle. By means of a further computing unit of the further motor vehicle, an existence of an object is verified based on the further measurement data.

Possibly, the further motor vehicle cannot capture the same information or equally complete information with respect to the object by means of the further environment sensor system according to position of the further motor vehicle as the motor vehicle is able to do. However, the existence of the object may optionally be verified on condition that the motor vehicle is located sufficiently close to the object.

Optionally, the further motor vehicle may determine the first or the second relative position or a further relative position of the object in relation to the landmark based on the further measurement data, in particular by means of the further computing unit. The position of the landmark may for example be ascertained from the further measurement data by means of the computing unit or from further map data of a further map of the further motor vehicle.

According to a further independent and exemplary aspect, a method for at least partially automatic vehicle control is specified. Therein, an information signal is provided according to an embodiment of a method for providing an information signal, wherein the information signal is transmitted to the further motor vehicle and/or to the server computer system by means of the communication interface according to the embodiment.

The further motor vehicle is at least partially automatically controlled by means of the further computing unit depending on the information signal or depending on the further information signal. For at least partially automatically controlling the further motor vehicle, the further computing unit may determine an approaching strategy for approaching or for passing the object for example based on the first and optionally the second relative position of the object as well as on the position of the landmark, which the further computing unit ascertains based on the further measurement data or the further map.

Correspondingly, the further computing unit or a control unit of the further motor vehicle controlled by the further computing unit may at least partially automatically initiate a brake, acceleration and/or steering maneuver.

In various embodiments, the further motor vehicle may in particular be a motor vehicle, which corresponds to level 3, level 4 or level 5 of the SAE J3016 classification. Here and in the following, the designation SAEJ J3016 relates to the corresponding standard in the version of June 2018.

In some embodiments of the method for at least partially automatic vehicle control, further coordinates of the object are determined in a further map coordinate system of a further map of the further motor vehicle depending on the first relative position by means of the further computing unit. The further motor vehicle is at least partially automatically controlled based on the further coordinates of the object by means of the further computing unit.

Therein, the further computing unit ascertains the first relative position of the object in particular based on the information signal or the further information signal and in particular based on further map data of the further map.

In some embodiments, the further motor vehicle is at least partially automatically controlled based on the class associated with the object by means of the further computing unit.

According to a further independent and exemplary aspect, a communication system for assisting an at least partially automatic vehicle control is specified. The communication system comprises a computing unit for a motor vehicle, a communication interface for the motor vehicle and an environment sensor system for the motor vehicle. The environment sensor system is configured to generate measurement data of surroundings of the motor vehicle. The computing unit is configured to identify an object and a landmark in the surroundings based on the measurement data and to determine a first relative position of the object in relation to the landmark based on the measurement data. The communication interface is configured to generate and thereby provide an information signal depending on the first relative position of the object.

In some embodiments of the communication system, the communication system includes a map for the motor vehicle. The computing unit is configured to perform a comparison based on map data of the map and the measurement data and to identify the object based on a result of the comparison.

In some embodiments of the communication system, the communication system comprises a further communication interface for a further motor vehicle. The communication interface is configured to transmit the information signal to the further communication interface, and the further communication interface is in particular configured to receive the information signal from the communication interface.

In some embodiments, the communication system includes a server computer system and the communication interface is configured to transmit the information signal to the server computer system, and the server computer system is configured to generate a further information signal depending on the information signal and to transmit it to the further communication interface. The further communication interface is in particular configured to receive the further information signal from the server computer system.

In some embodiments, the communication system includes a further environment sensor system for the further motor vehicle. The further environment sensor system is configured to generate further measurement data of further surroundings of the further motor vehicle. The further computing unit of the further motor vehicle is configured to verify an existence of the object based on the further measurement data.

Further embodiments of the communication system are immediately apparent from the different embodiments of the method for providing the information signal and vice versa as well as from the different embodiments of the method for at least partially automatic vehicle control and vice versa. In particular, the communication system according to the teachings herein is configured to perform a method for providing the information signal and/or a method for at least partially automatic vehicle control according to the teachings herein or the communication system according to the teachings herein performs such a method.

According to a further independent and exemplary aspect, a computer program with instructions is specified. Upon execution of the computer program by a communication system according to the teachings herein, in particular by the computing unit of the motor vehicle, the instructions cause the communication system to perform a method for providing an information signal according to the teachings herein.

According to a further independent and exemplary aspect, a further computer program with further instructions is specified, wherein the further instructions, upon execution of the further computer program by a communication system according to the teachings herein, cause the communication system, in particular the computing unit of the motor vehicle and the further computing unit of the further motor vehicle, to perform a method for at least partially automatically controlling a motor vehicle according to the teachings herein.

According to a further independent and exemplary aspect, a computer program system is specified, which includes the computer program and the further computer program according to the teachings herein.

According to a further independent and exemplary aspect, a computer-readable storage medium is specified, on which a computer program according to the teachings herein and/or a further computer program according to the teachings herein are stored.

According to a further independent and exemplary aspect, a motor vehicle with a communication system according to the teachings herein is specified.

The invention also includes the combinations of the features of the described embodiments.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
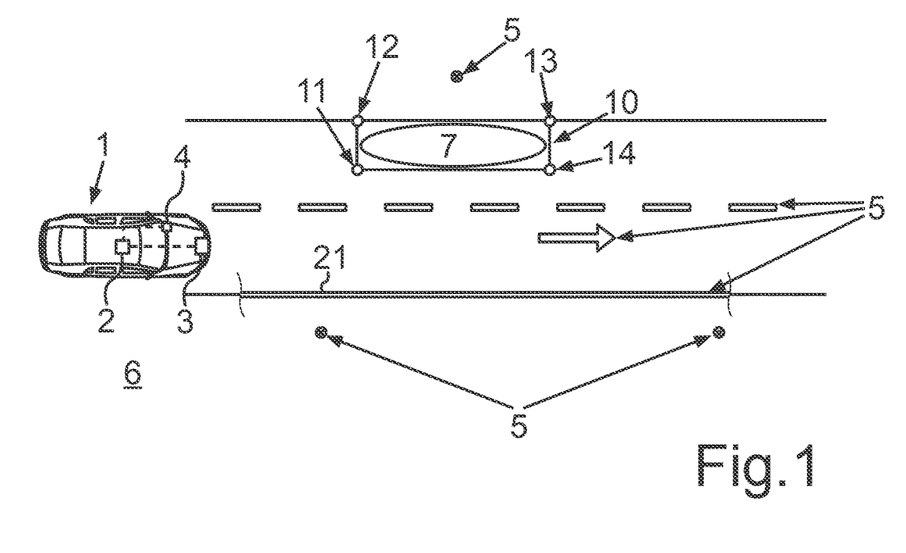
FIG. 1 shows a schematic representation of an exemplary embodiment of a communication system.

In FIG. 1, a motor vehicle 1 is shown, which comprises various components of an exemplary embodiment of a communication system 6.

The communication system 6 comprises a computing unit 2 of the motor vehicle 1, an environment sensor system 3, which is for example configured as a camera, radar system or lidar system, of the motor vehicle 1 as well as a communication interface 4 of the motor vehicle 1, in particular for V2V and/or V2X communication.

For example, the motor vehicle 1 travels on a lane of a roadway 21. An object 7, for example a construction site, a stationary truck or the like, is also on the roadway 21, in particular on a lane different from the motor vehicle 1.

The object 7 is in particular a deviation of the measurement data from the map data. In particular, the object 7 is not in the map data or in another position than described by the measurement data.

Besides the object 7, one or more landmarks 5 are within the field of view of the environment sensor system 3. The landmarks 5 may for example be sign posts, roadway markings, roadway boundaries, lampposts or the like.

The environment sensor system 3 may generate measurement data of the field of view of the environment sensor system 3, in particular in the form of camera images or point clouds of sample points of the surroundings of the motor vehicle 1. The measurement data is transmitted from the environment sensor system 3 for example to the computing unit 2. The computing unit 2 identifies the object 7 and at least one of the landmarks 5 in the surroundings of the motor vehicle 1 for example based on the measurement data.

For example, the computing unit 2 may determine a geometric FIG. 10, by which the object 7 is approximately described and in particular enclosed. For example, the geometric FIG. 10 may be an envelope 10 of a projection of the object 7 onto the roadway 21. For determining the envelope 10, the computing unit 2 for example determines multiple supporting points 11, 12, 13, 14 of the envelope 10. The supporting points 11, 12, 13, 14 may for example represent corner points of a polygon.

For example, one of the supporting points 11, 12, 13, 14 may serve as a reference point 11 such that the remaining supporting points may be indicated in relation to the reference point 11.

Figure 2:
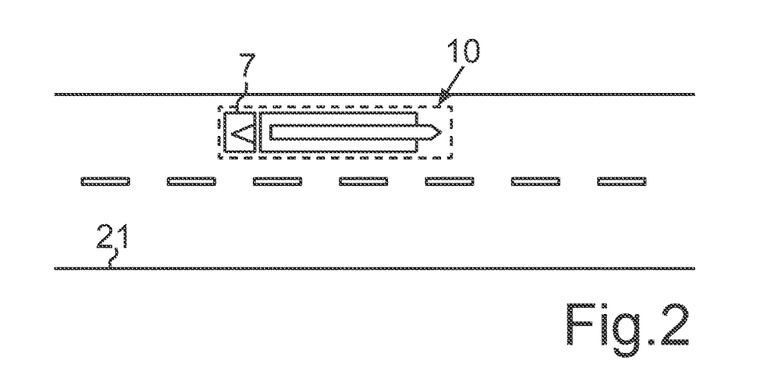
FIG. 2 shows an envelope of a projection of an object onto a roadway.
Figure 3:
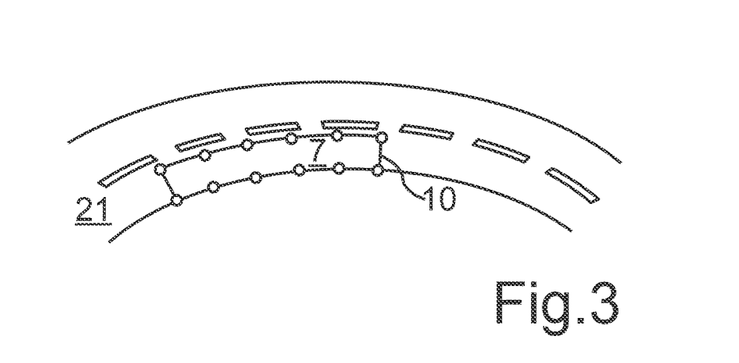
FIG. 3 shows an envelope of a projection of a further object onto a roadway.

In addition to the envelope 10, height information of the object 7 may optionally also be determined based on the measurement data by means of the computing unit 2. In FIG. 2, an alternative object 7 with corresponding envelope 10 is illustrated. It may for example be a stationary truck with a protruding load. In FIG. 3, a further alternative object 7 with a corresponding envelope 10 is illustrated. For example, it may be a construction site in a curve of the roadway 21.

For example, the envelope 10 may be described by a polygonal chain such as for instance a rectangle. In particular, the envelope 10 may be described by the supporting points 11, 12, 13, 14, thus corner points of the polygonal chain. In case of a curved envelope 10, the supporting points 11, 12, 13, 14 may approximate the curvature such as for example schematically illustrated in FIG. 3. The curvature may for example also be described by mathematic functions, for example by clothoids.

In particular, not describable or only difficultly describable geometric information of the object 7, for example in case of construction sites or other very irregular objects, may be approximated by the envelope 10, for example based on map information, which is stored in a HD map of the motor vehicle 1. For example, a construction site course at the roadside may be described by the course of the roadside, which is for example stored in the HD map.

In various embodiments, the computing unit 2 may perform a semantic classification of dynamic and static objects 7, for example obstacles or other deviations from the map, based on the measurement data.

Coordinates of the identified dynamic or static object 7 may be indicated in absolute coordinates or in relative coordinates to a reference point. For example, coordinates in a map coordinate system of the map may be understood by absolute coordinates, for example in a geodetic coordinate system like WGS84. As described, the reference point 11 may for example be a corner of the envelope 10 or of the object 7. The absolute position, thus the position in the map coordinate system, of the motor vehicle 1 and of the environment sensor system 3, respectively, may also serve as an alternative reference point.

For example, the computing unit 2 may determine coordinates of the at least one landmark 5 in the map coordinate system. The landmarks 5 are used in the landmark-based ego localization of the motor vehicle 1 and are stored in the HD map in particular with very high accuracy.

The advanced function of the communication system 6 is explained in more detail with reference to various aspects of methods according to the teachings herein, in particular with reference to FIG. 4, FIG. 5 and FIG. 6.

Figure 4:
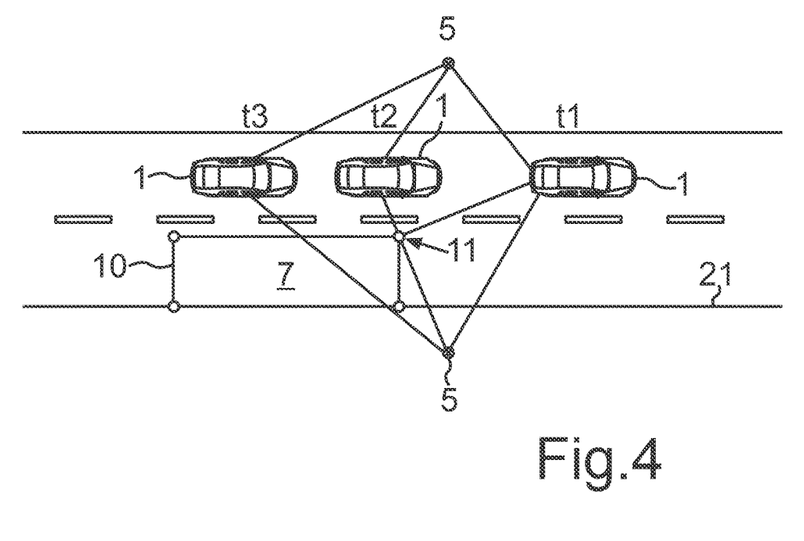
FIG. 4 shows a schematic representation of various aspects of an exemplary embodiment of a method for providing an information signal.

In FIG. 4, the motor vehicle 1 is schematically illustrated on the roadway 21 at three different points of time t1, t2, t3. A first point 11 of the envelope 10 and optionally further, in particular all of the further, points 12, 13, 14 of the envelope 10 are measured during passage of the motor vehicle 1 at the object 7 for example in repeated manner in relation to the position of the motor vehicle 1 changing by the travel.

Figure 5:
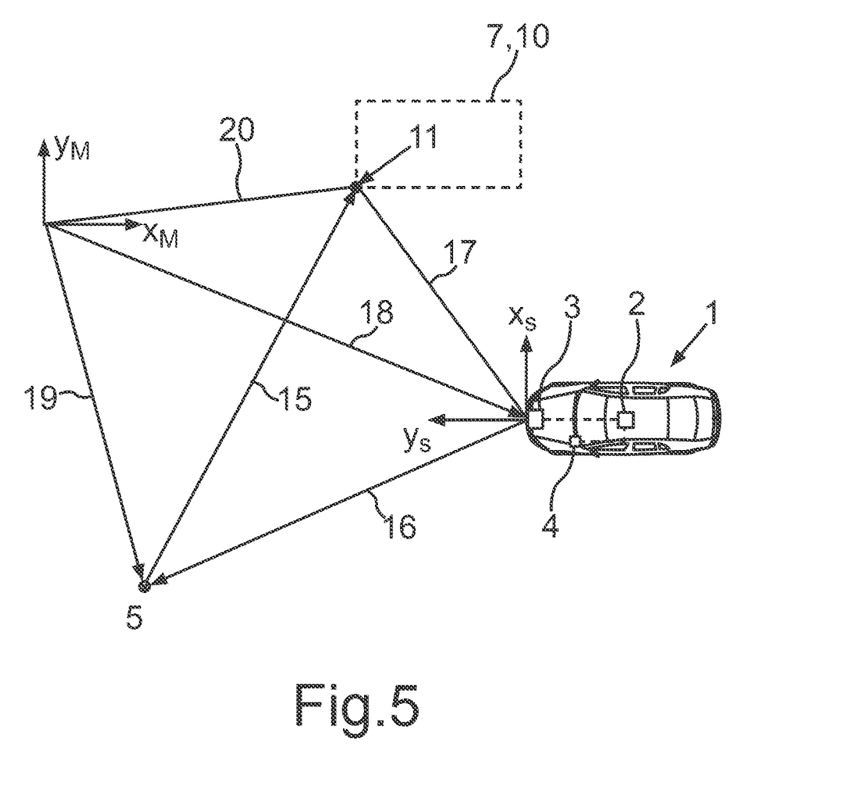
FIG. 5 shows a schematic representation of various aspects of a further exemplary embodiment of a method for providing an information signal.

In other words, a position vector 17 of the point 11 is calculated in a sensor coordinate system with axes $X_S$, $Y_S$, as it is illustrated in FIG. 5. The sensor coordinate system is in particular a coordinate system rigidly connected to the environment sensor system 3.

In addition, the computing unit 2 also ascertains its changing positions in relation to the at least one landmark 5 during the passage. In other words, the computing unit 2 determines a position vector 16 of the landmark 5 in the sensor coordinate system as illustrated in FIG. 5.

The computing unit 2 may calculate a connection vector 15 from the landmark 5 to the point 11 from the difference of the position vectors 16, 17 as illustrated in FIG. 5. The connection vector 15 corresponds to a relative position of the first point 11 in relation to the landmark 5.

In other embodiments, the computing unit 2 may calculate various position vectors in the map coordinate system, which is labeled with the X-axis $X_M$ and the Y-axis $Y_M$ in FIG. 5. For example, the computing unit 2 may determine a position vector 20 of the point 11 in the map coordinate system as a corresponding vector sum of a position vector 19 of the landmark 5 in the map coordinate system, the position vector 16 of the landmark 5 in the sensor coordinate system and the position vector 17 of the point 11 in the sensor coordinate system. The position vector 19 of the landmark 5 in the map coordinate system is for example stored in the HD map and thus may be directly retrieved by the computing unit 2.

Similarly, the computing unit 2 may calculate a position vector 18 of the motor vehicle 1 and the sensor system 3, respectively, in particular of a coordinate origin of the sensor coordinate system, in the map coordinate system as a corresponding vector sum of the position vector 19 of the landmark 5 in the map coordinate system and the position vector 16 of the landmark 5 in the sensor coordinate system.

The connection vector 15 from the landmark 5 to the point 11 may then be calculated as a corresponding vector sum of the position vector 20 of the point 11 in the map coordinate system, of the position vector 18 of the environment sensor system 3 in the map coordinate system and of the position vector 16 of the landmark 5 in the sensor coordinate system by the computing unit 2.

Figure 6:
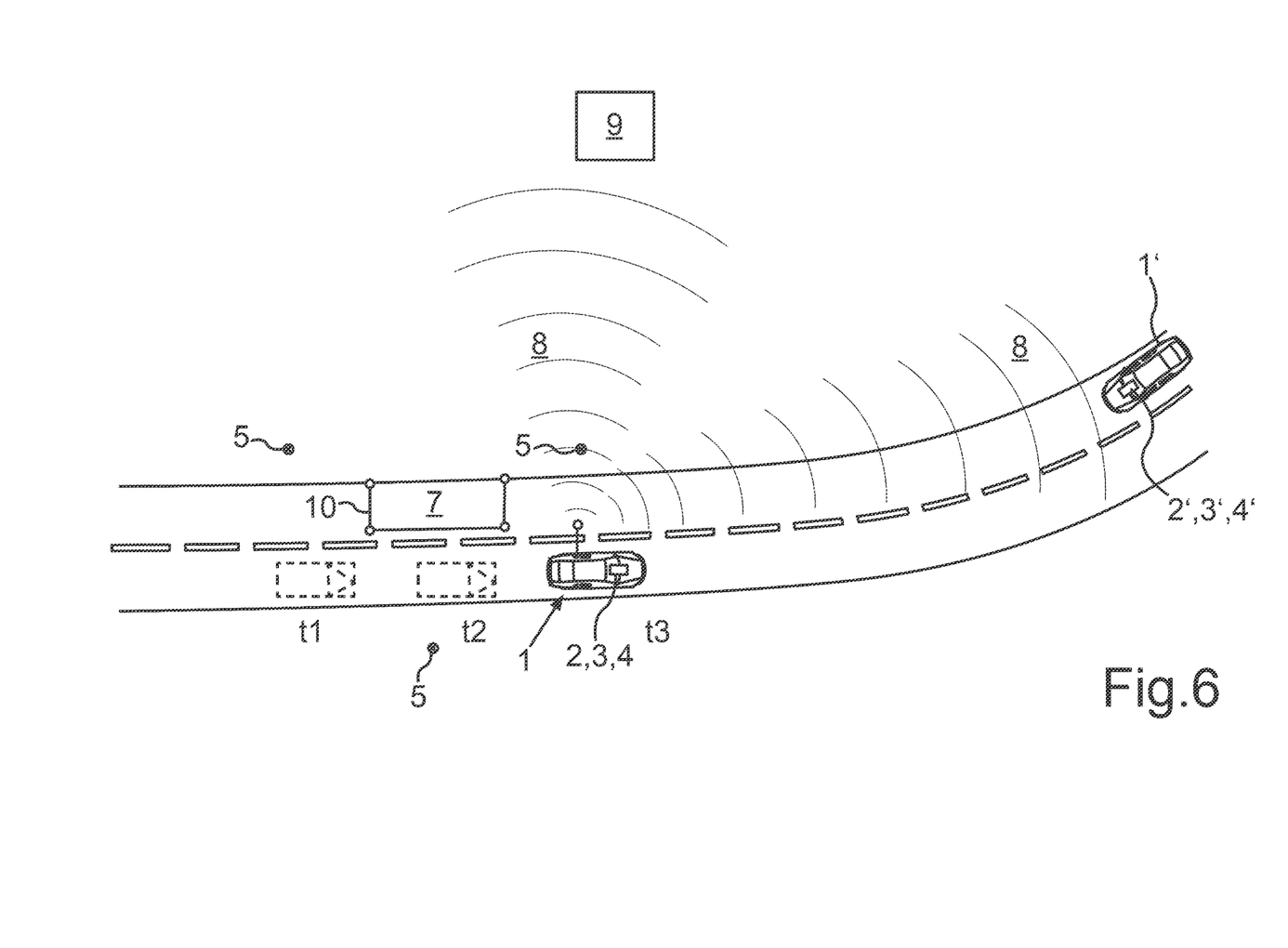
FIG. 6 shows a schematic representation of various aspects of an exemplary embodiment of a method for at least partially automatic vehicle control.

The communication interface 4 generates an information signal 8, for example a V2X message, as illustrated in FIG. 6, based on various information, in particular based on the connection vector 15. Optionally, the information signal may include the class associated with the object, the height information. In addition, the information signal 8 may also include the relative positions of the further points 12, 13, 14 of the envelope 10 in relation to the point 11, in relation to the landmark 5 or in relation to another reference point.

For example, the information signal 8 may also include the position vector 20 of the point 11 in the map coordinate system. For example, the information signal 8 may also include the position vector 19 of the landmark 5 in the map coordinate system. For example, the information signal 8 may include corresponding connection vectors from the landmark 5 to one or multiple of the further points 12, 13, 14 of the envelope 10.

Optionally, the information signal may also include corresponding inaccuracies or confidence values for the mentioned vectors and positions.

In particular, the communication interface 4 may emit the information signal 8 at the point of time t3 or later, in particular if multiple corresponding connection vectors 15 from different perspectives have been determined for the first point 11, to ensure a higher accuracy in the determination of the connection vector 15.

The described representation concept may be applied to all types of dynamic and static objects 7.

As illustrated in FIG. 6, the communication interface 4 transmits the information signal 8 to a backend server 9 and/or to a receiver vehicle 1'. The backend server 9 may centrally communicate the information signal 8 and a further information signal derived therefrom, respectively, to further motor vehicles not illustrated.

Basically, the receiver vehicle 1' first does not have concrete information about the correctness and accuracy of the information from the information signal 8. Therefore, it may for example be proceeded in multiple steps to ensure safety and accuracy as high as possible.

If the receiver vehicle 1' is for example still away from the object 7 as far as it cannot itself detect it, for example by means of a further environment sensor system 3' of the receiver vehicle 1' and a further computing unit 2' of the receiver vehicle 1', thus, the receiver vehicle 1' may assume the correctness of the V2X message, thus, the information signal 8. Based thereon, the computing unit may at least partially automatically plan an approaching strategy for approaching the object 7 and optionally also a strategy for passing the object 7.

If the receiver vehicle 1' may itself detect the object 7, thus, it may at least verify its existence and evaluate or validate that part of the information about the object 7, which it may capture itself.

While the further receiver vehicle 1' approaches the object 7, it may for example travel suitable trajectories, which allow a visible range to the object 7 as large as possible. For example, the receiver vehicle 1' could drive at lane edges to be able to better detect corresponding sides of the object 7. If the traffic situation allows, the further receiver vehicle 1' could also temporarily leave its lane thereto.

The further computing unit 2' of the receiver vehicle 1' may at least partially automatically control the receiver vehicle 1' based on the information signal 8, in particular on the connection vector 15 from the landmark 5 to the point 11. This is in particular beneficial if the object or the current position of the object 7 is not yet stored in a further map of the receiver vehicle 1'. Due to the transmission of the relative position of the object 7, in particular of the point 11, in relation to the landmark 5, the receiver vehicle 1' may use its own map material to perform the at least partially automatic control. Deviations from the map material of the motor vehicle 1 do not adversely affect due to the relative indication by the connection vector 15.

Optionally, an accurate measurement of the length of the object cannot be possible from the perspective of the approaching receiver vehicle 1'. However, the information obtained by means of the further environment sensor system 3' may serve for making plausible the information of the information signal 8. In making plausible, the probability that the information of the information signal 8 is correct may for example be calculated by means of the further computing unit 2'. Thereto, further V2X messages of further motor vehicles may also be used, which in particular describe the same object 7. If a semantic classification has been effected, it may also serve for making plausible, in particular because typical dimensions or maximally admissible dimensions, for instance corresponding to the road traffic regulations, may then possibly be known. Based thereon, the receiver vehicle 1' may update its approaching strategy and optionally its strategy for passing the object 7.

The receiver vehicle 1' can, upon the integration of the object 7 in its environment model, use the corresponding landmark information. Thereby, the influences of deviations of the maps in the motor vehicle 1 and the further map in the receiver vehicle 1' are minimized. In respective map coordinate systems, the coordinates of the point 11 may be different. In particular, deviations in the range of one or several meters may occur. By the indication of the relative position in relation to the landmark 5, in particular in relation to a center line of the roadway 21, in relation to the roadside, to lampposts, power poles, sign posts or the like, a corresponding adaptation of the map of the receiver vehicle 1' may be effected. In particular, a linear offset and a rotation may be compensated for. Thereby, the receiver vehicle 1' may register the object 7 in its map or in its environment model with lower error. With suitable distance to the object 7, the receiver vehicle 1' itself may additionally detect the landmarks in its own surroundings. Thereby, the integration in the environment model becomes more accurate and reliable.

According to the teachings herein, thus, an at least partially automatic vehicle control with reduced error may be provided. In particular, association errors in the environment model of the receiver vehicle, thus of the partially automatically controlled motor vehicle, may be reduced. The association with different maps may be improved. In addition, stepwise verifying and making plausible the corresponding message contents may be effected.

LIST OF REFERENCE NUMERALS

1 Motor vehicle
1' Motor vehicle

2 Computing unit
2' Computing unit
3 Environment sensor system
3' Environment sensor system
4 Communication interface
4' Communication interface
5 Landmark
6 Communication system
7 Object
8 Information signal
9 Backend server
10 Envelope
11 Point
12 Point
13 Point
14 Point
15 Connection vector
16 Position vector
17 Position vector
18 Position vector
19 Position vector
20 Position vector
21 Roadway The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for providing an information signal for at least partially automatic vehicle control, comprising:
generating sensor-based measurement data of surroundings of a motor vehicle by an environment sensor system of the motor vehicle;
identifying based on the sensor-based measurement data, a landmark and an object physically distinct from the landmark, wherein the landmark is included in map data accessible to a computing unit of the motor vehicle, but the object is not included in the map data;
calculating, using the sensor-based measurement data, a first relative position of the object identified based on the sensor-based measurement data but not included in the map data relative to the landmark identified based on the sensor-based measurement data and included in the map data, including calculating a geometric vector from (a) the landmark identified based on the sensor-based measurement data and included in the map data to (b) the object identified based on the sensor-based measurement data but not included in the map data; and
generating the information signal comprising information on the first relative position of the object not included in the map data relative to the landmark included in the map data; and
transmitting, using a communication interface of the motor vehicle, the information signal, including the information on the first relative position of the object not included in the map data relative to the landmark included in the map data, to at least one further motor vehicle directly or indirectly;
wherein the at least one further motor vehicle is at least partially automatically controlled based on the information signal, including the information on the first relative position of the object not included in the map data relative to the landmark included in the map data.

2. The method of claim 1, comprising:
performing a comparison based on the map data of the motor vehicle and the measurement data; and
identifying the object based on a result of the comparison.

3. The method of claim 2, further comprising:
determining coordinates of the object in a preset sensor coordinate system depending on the measurement data;
determining coordinates of the landmark in the sensor coordinate system depending on the measurement data; and
determining the first relative position depending on the coordinates of the object and the landmark in the sensor coordinate system.

4. The method of claim 2, further comprising:
determining coordinates of the object in a map coordinate system of a map of the motor vehicle depending on the measurement data;
determining coordinates of the environment sensor system in the map coordinate system depending on the measurement data; and
determining the first relative position depending on the coordinates of the object and of the environment sensor system in the map coordinate system.

5. The method of claim 1, comprising:
determining coordinates of the object in a preset sensor coordinate system depending on the measurement data;
determining coordinates of the landmark in the sensor coordinate system depending on the measurement data; and
determining the geometric vector from the landmark included in the map data to the object not included in the map data based on the coordinates of the object and the landmark in the sensor coordinate system.

6. The method of claim 5, further comprising:
determining coordinates of the object in a map coordinate system of a map of the motor vehicle depending on the measurement data;
determining coordinates of the environment sensor system in the map coordinate system depending on the measurement data; and
determining the first relative position depending on the coordinates of the object and of the environment sensor system in the map coordinate system.

7. The method of claim 1, comprising:
determining coordinates of the object in a map coordinate system of a map of the motor vehicle depending on the measurement data;
determining coordinates of the environment sensor system in the map coordinate system depending on the measurement data; and
determining the geometric vector from the landmark included in the map data to the object not included in the map data based on the coordinates of the object and of the environment sensor system in the map coordinate system.

8. The method of claim 1, comprising:
determining a geometric figure for approximately describing the object based on the measurement data; and
determining a relative position of a first point of the geometric figure in relation to the landmark as the first relative position of the object.

9. The method of claim 1, comprising:
determining a second relative position of the object based on the measurement data; and
generating the information signal depending on the second relative position using the communication interface.

10. The method of claim 1, comprising:
associating a class of a preset set of classes with the object based on the measurement data; and
generating the information signal depending on the class associated with the object using the communication interface.

11. The method of claim 1, comprising:
transmitting the information signal to the at least one further motor vehicle using the communication interface; and/or
transmitting the information signal to a server computer system using the communication interface and generating a further information signal depending on the information signal and wherein the server computer system transmits the further information signal to the at least one further motor vehicle.

12. The method of claim 11, comprising:
generating further measurement data of further surroundings of the at least one further motor vehicle using a further environment sensor system of the further motor vehicle; and
verifying an existence of the object based on the further measurement data using a further computing unit of the at least one further motor vehicle.

13. The method of claim 1, comprising:
determining a geometric figure for approximately describing the object based on the measurement data; and
determining a relative position of a first point of the geometric figure in relation to the landmark as the first relative position of the object.

14. A communication system for supporting an at least partially automatic vehicle control, the communication system comprising:
a first computing unit for a motor vehicle, a communication interface for the motor vehicle and an environment sensor system for the motor vehicle, configured to generate sensor-based measurement data of surroundings of the motor vehicle;
wherein the first computing unit is configured to:
identify, using on the sensor-based measurement data, a landmark and an object physically distinct from the landmark, wherein the landmark is included in map data accessible to the first computing unit, but the object is not included in the map data; and
calculate a first relative position of the object identified based on the sensor-based measurement data but not included in the map data relative to the landmark identified based on the sensor-based measurement data and included in the map data, including calculating a geometric vector from (a) the landmark included in the map data to (b) the object not included in the map data, based on the sensor-based measurement data; and
the communication interface is configured to transmit an information signal comprising information on the first relative position of the object not included in the map data relative to the landmark included in the map data to a further motor vehicle directly or indirectly;
a second computing unit configured to perform at least partial automatic control of the further motor vehicle based on the information signal, including the information on the first relative position of the object not included in the map data relative to the landmark included in the map data.

15. The communication system of claim 14, wherein
the communication system comprises a map for the motor vehicle; and
the first computing unit is configured to perform a comparison based on the map data of the map and the measurement data and to identify the object based on a result of the comparison.

16. The communication system of claim 14, wherein the communication system comprises a further communication interface for the further motor vehicle and
the communication interface is configured to transmit the information signal to the further communication interface; and/or
the communication system comprises a server computer system and the communication interface is configured to transmit the information signal to the server computer system and the server computer system is configured to generate a further information signal depending on the information signal and to transmit it to the further communication interface.

* * * * *